United States Patent [19]

Ootsuka et al.

[11] Patent Number: 4,567,751
[45] Date of Patent: Feb. 4, 1986

[54] KNOCKING DETECTION DEVICE IN DIESEL ENGINE

[75] Inventors: Yoshinori Ootsuka; Tadashi Hattori; Minoru Yamamoto, all of Okazaki; Tadashi Ozaki, Gamagori, all of Japan

[73] Assignees: Nippon Soken, Inc., Nishio; Nippondenso Co., Ltd., Kariya, both of Japan

[21] Appl. No.: 539,318

[22] Filed: Oct. 5, 1983

[30] Foreign Application Priority Data

Oct. 7, 1982 [JP] Japan .................. 57-175289
Oct. 16, 1982 [JP] Japan .................. 57-180572

[51] Int. Cl.⁴ .......................................... G01L 23/22
[52] U.S. Cl. ............................................... 73/35
[58] Field of Search .................. 73/35, 115, 119 A; 123/425

[56] References Cited

U.S. PATENT DOCUMENTS 3,183,708  5/1965  Roddick ............................ 73/35
4,292,841  10/1981  Wesley ......................... 73/119 A
4,406,265  9/1983  Brandt et al. ..................... 123/425

Primary Examiner—Stewart J. Levy
Assistant Examiner—John E. Chapman, Jr.
Attorney, Agent, or Firm—Cushman, Darby & Cushman

[57] ABSTRACT

A device for detection of knocking in a diesel engine has a pressure sensor including a piezoelectric element and detecting a rate of change in combustion pressure, an angle sensor for detecting the rotation of the engine or engine speed, and a knocking detector for receiving outputs from the pressure and angle sensors. The knocking detector serves to detect a rate of change in combustion pressure per unit angle upon necessary correction by the engine speed and to compare the obtained rate with a reference rate of 5 atm/deg, at which knocking occurs. Knocking is detected when the detected rate exceeds the reference rate.

5 Claims, 12 Drawing Figures

KNOCKING DETECTION DEVICE IN DIESEL ENGINE

BACKGROUND OF THE INVENTION

1. Field of the Invention

The present invention relates to a device for detection of knocking in a diesel engine.

2. Description of the Prior Art

When an ignition lag or delay is experienced in a diesel engine in a time duration from an injection beginning from which the fuel injection is started to an ignition timing at which the combustion pressure is abruptly increased, the subsequent combustion is adversely affected. As the ignition delay time increases, the amount of the air-fuel mixture obtained before ignition increases. Such an increased mixture burns at the same time to give rise to an abrupt pressure rise. This causes vibration, knocking, and the like.

Diesel knocking is attributed to a high rate of increase in combustion pressure per unit angle, i.e., $dP/d\theta$, where P is the combustion pressure of the engine and $\theta$ is the angle of the crankshaft. When the value of the rate $dP/d\theta$ exceeds about 5 atm/deg, knocking becomes particularly serious, adversely affecting the engine. In a diesel engine, the compression ratio is generally high. Thus, the base vibration is large and overcomes vibration of the engine block. This prevents reliable detection of knocking based on detection of vibration of the engine block unlike the case of a gasoline engine, in which the vibration level of the base is low.

SUMMARY OF THE INVENTION

It is the object of the present invention to achieve reliable detection of knocking in a diesel engine.

In order to achieve the above object, there is provided, according to the fundamental aspect of the present invention, a device for detection of knocking comprising a pressure sensor having a piezoelectric element and detecting a rate of change in combustion pressure, an angle sensor for detecting the rotation of the engine, and a knocking detector for detecting knocking in accordance with outputs from the pressure sensor and the angle sensor. The knocking detector has a rotation rate sensor for converting the output from the angle sensor into a rotation rate or engine speed and a divider for dividing the output from the pressure sensor by the output from the rotation rate sensor. The knocking detector detects knocking when the output from the divider exceeds a predetermined value.

DESCRIPTION OF THE PREFERRED EMBODIMENT

The present invention allows reliable detection of knocking in a diesel engine by detecting a rate of change in combustion pressure per unit time using a pressure sensor of the differential output type, correcting the detected rate by the engine speed to obtain a rate of change in combustion pressure per unit angle, and comparing the corrected rate with a reference rate at which knocking occurs, e.g., 5 atm/deg.

Figure 1:
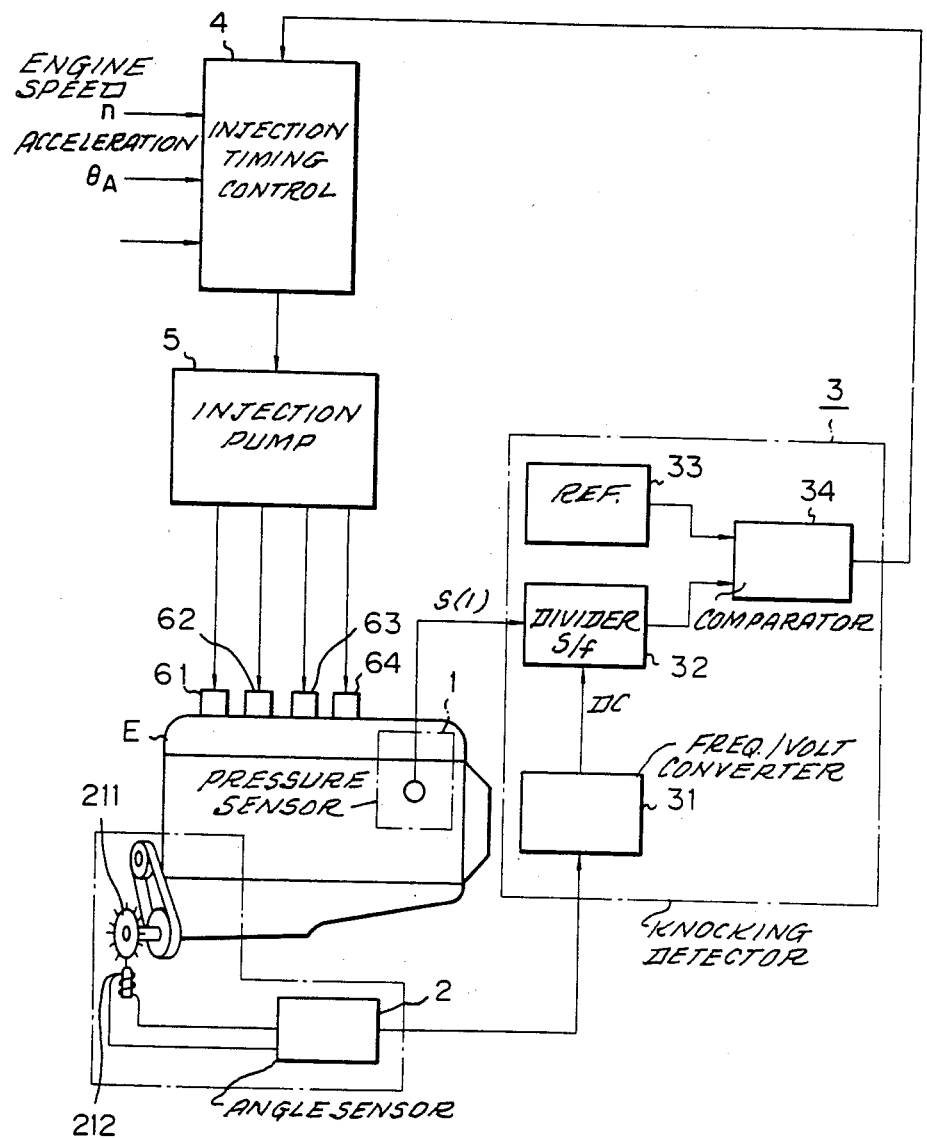
FIG. 1 is a block diagram of a device for detection of knocking in a diesel engine according to an embodiment of the present invention.

A device for detection of knocking in a diesel engine according to an embodiment of the present invention is illustrated in FIG. 1.

Referring to FIG. 1, reference symbol E denotes a straight-type 4-cylinder diesel engine. A pressure sensor 1 comprises a piezoelectric element and produces an output S(1) which represents a rate of change in combustion pressure per unit time. Reference numerals 2 and 3 denote an angle sensor and a knocking detector, respectively. An injection timing control circuit 4 calculates a reference injection timing based on a rotation rate or engine speed n, an acceleration amount $\theta_A$, and so on. In response to a signal indicating occurrence of knocking from the knocking detector 3, the injection timing control circuit 4 delays the injection timing for a predetermined time. In the absence of such a signal, the injection timing control circuit 4 controls an injection pump 5 such that injection is performed at the reference injection timing. Injection nozzles 61 to 64 inject fuel into the respective cylinders.

In the knocking detector 3, a frequency/voltage converter 31 converts the frequency of an output pulse from the angle sensor 2 (to be described in detail later) into a DC voltage which is proportional to the rotation rate of the engine or the engine speed. A divider 32 divides the output from the pressure sensor 1 by the output from the frequency/voltage converter 31, which results in conversion of the rate of change in combustion pressure per unit time into the rate of change in pressure per unit angle. A reference voltage generator 33 generates a reference DC voltage corresponding to the rate of change in combustion pressure per unit angle at which knocking occurs, e.g., 5 atm/deg. A comparator 34 compares the output voltage representing a current rate of change in combustion pressure per unit angle from the divider 32 with the reference DC voltage representing 5 atm/deg from the reference voltage generator 33. When the voltage from the divider 32 exceeds the reference DC voltage, the comparator 34 produces an output signal S(34).

Figure 2:
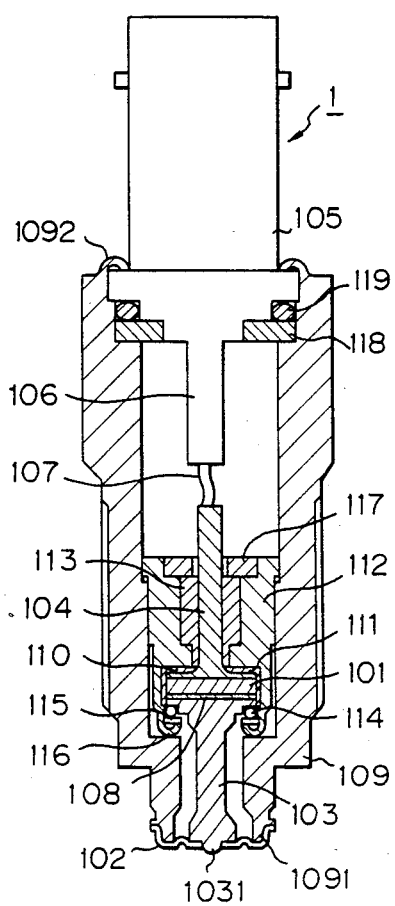
FIG. 2 is a sectional view of the configuration of a pressure sensor of the device shown in FIG. 1.

An example of the pressure sensor 1 to be used in the device of the present invention is shown in FIG. 2.

A pressure stop 103 is interposed as a pressure detection medium between a piezoelectric element 101 and a diaphragm 102. An output electrode 104 is connected to a terminal 106 of a connector 105 through a lead wire 107. A ground electrode 108 is grounded to a housing 109 through the pressure stop 103 and the diaphragm 102. Insulators 110 and 111 insulate the piezoelectric element 101 from a sensor body 112. Another insulator 113 insulates the electrode 104 from the sensor body 112.

The sensor assembly is assembled in the following manner. The insulator 110, the electrode 104, the piezoelectric element 101, the pressure stop 103, and the insulator 111 are inserted into the sensor body 112 through its lower opening. A calking 116 of the sensor body is calked to the outer surface of the pressure stop 103 through a hollow metal ring 114 and a spacer 115 so as to fix the piezoelectric element 101 and the pressure stop 103 to the sensor body. The insulator 113 is inserted into the sensor body 112 through its upper opening. Thereafter, a spacer 117 is pressed into the upper opening of the sensor body to complete the sensor assembly. The hollow metal ring 114 spring-biases the piezoelectric element 101.

The thus obtained sensor assembly is inserted within the inner wall of the housing 109. The diaphragm 102 is welded to a projection 1031 at the end of the pressure step 103 and to a projection 1091 at the end of the housing 109.

The connector 105 is fixed to the housing 109 by calking a calking 1092 of the housing 109 through an O-ring 119.

The pressure sensor as described above comprises a piezoelectric element and produces an output signal S(1) which represents a rate of change in combustion pressure per unit time, i.e., dP/dt, where P is the combustion pressure and t is time.

Figure 3:
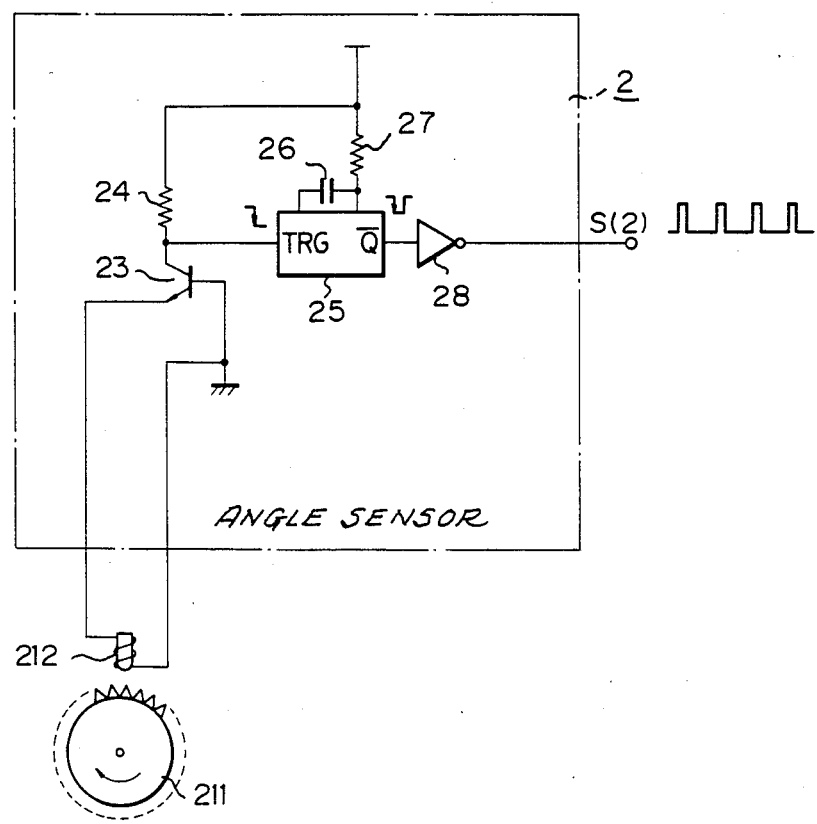
FIG. 3 is a circuit diagram of an angle sensor of the device shown in FIG. 1.

In FIG. 3 is shown the configuration of the angle sensor 2. Referring to FIG. 3, a rotor 211 has a plurality of projections on its outer periphery and is fixed to a distributor shaft (not shown) for rotation therewith. An electromagnetic pickup 212 opposes a projection of the rotor 211. Reference numerals 23 and 24 denote a transistor and a resistor, respectively; and 25 and 28, logic circuits (a one-shot multivibrator 25 and a driver 28). The collector of the transistor 23 is connected to a trigger terminal TRG of the one-shot multivibrator 25.

When the rotor 211 rotates in the direction indicated by the arrow and each projection opposes the electromagnetic pickup 212, the output from the electromagnetic pickup 212 drifts to a negative value. Then, the transistor 23 is turned on to trigger the one-shot multivibrator 25. The one-shot multivibrator 25 thus produces a signal of low level for a time period determined by the time constant which is, in turn, determined by a resistor 27 and a capacitor 26. This output signal of low level from the one-shot multi-vibrator 25 is converted into a signal of high level by the inverting driver 28.

The angle sensor 2 produces a rotation signal S(2) which has a frequency proportional to the engine speed and which has a pulse width independent therefrom.

Figure 4:
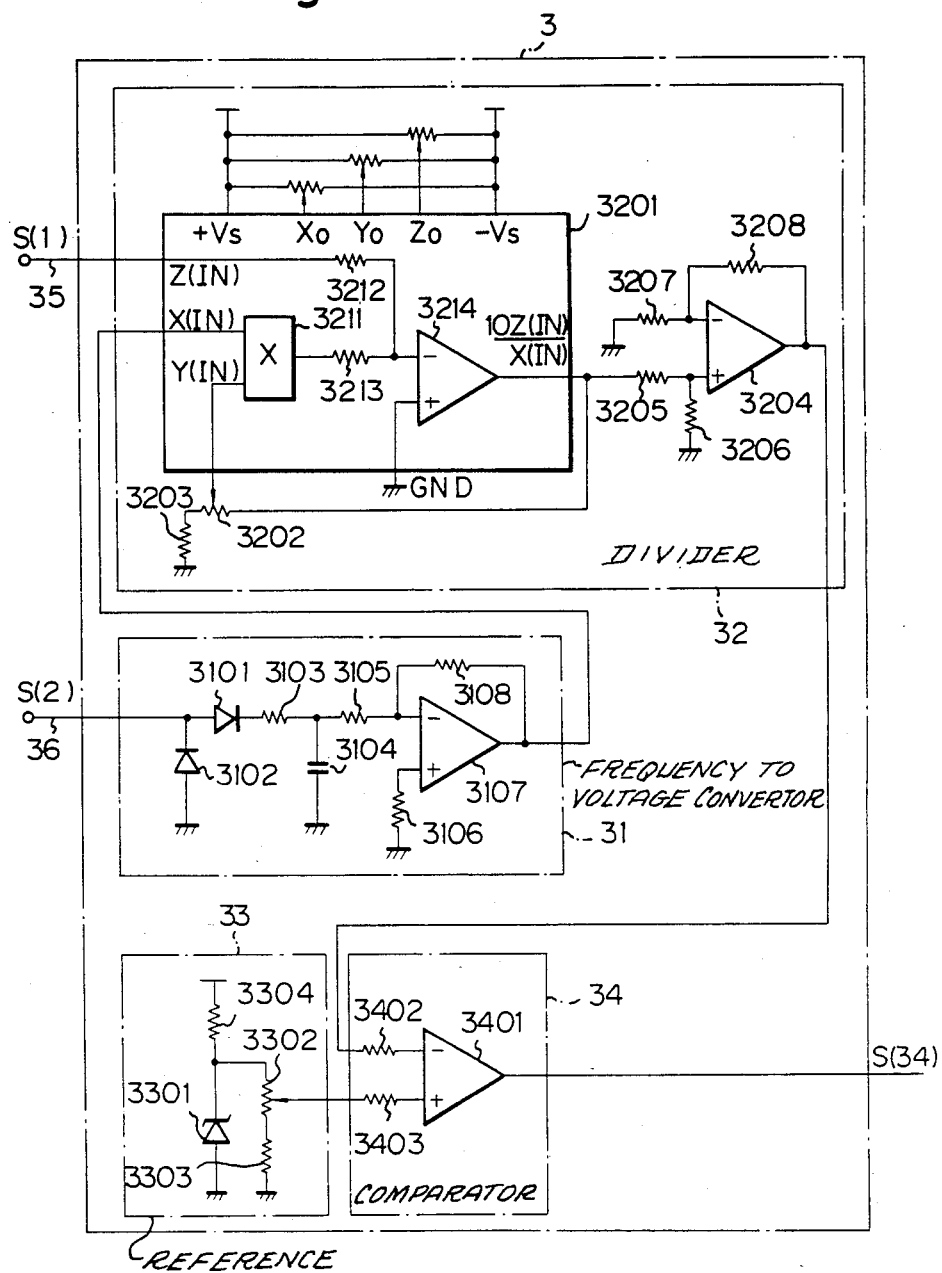
FIG. 4 is a circuit diagram of a knocking detector of the device shown in FIG. 1.

In FIG. 4 is shown the detailed configuration of the knocking detector 3.

The frequency/voltage converter 31 is coupled to an output signal S(2) from the angle sensor 2. The signal S(2) is integrated for its high level pulse duration by a diode 3101 by a time constant determined by a resistor 3103 and a capacitor 3104 and is converted into a DC voltage. The DC voltage is amplified by an inverting amplifier 3107 through a resistor 3105 into a negative DC voltage having a predetermined level proportional to the engine speed.

The divider 32 divides the signal S(1) representing the rate of change in combustion pressure per unit time dP/dt by a voltage proportional to the engine speed to obtain a rate of change in combustion pressure per unit angle. A dividing module 3201 may comprise an AD 530 series available from Analog Device Corp. An output signal S(1) from the pressure sensor 1 is supplied to a Z(IN) terminal of the module 3201, and a negative DC voltage proportional to the engine speed (from the inverting amplifier 3107) is supplied to an X(IN) terminal thereof. A Y(IN) terminal of the module 3201 resistor 3202. The module 3201 produces an output voltage proportional to Z(IN)/X(IN). A non-inverting amplifier 3204 amplifies the rate of change in combustion pressure per unit angle to a corresponding voltage level.

The reference voltage generator 33 consists of a Zener diode 3301 and resistors 3302, 3303, and 3304, and generates a reference voltage corresponding to 5 atm/deg, described above.

The comparator 34 compares a voltage representing the rate of change in combustion pressure per unit angle with the reference voltage to determine whether knocking has occurred.

The mode of operation of the device of the present invention will now be described. The output from the pressure sensor 1 is a differential output representing a rate of change in combustion pressure per unit time, i.e., dP/dt. The value wanted for discriminating occurrence of knocking is a rate of change in combustion pressure per unit angle: dP/dθ which holds the following relation with a rate of change in combustion pressure per unit time: dP/dt:

$$dP/d\theta = (dP/dt)\cdot(dt/d\theta) = (1/\omega)(dP/dt)$$

From the relation given above, it is seen that per unit time by the angular velocity or engine speed yields a rate of change in combustion pressure per unit angle. Accordingly, the rate of change in combustion pressure per unit angle may be obtained by converting an output pulse from the angle sensor 2 into a voltage proportional to the engine speed by the frequency/voltage converter 2 and then dividing the output from the pressure sensor 1 by this voltage. Comparison of the obtained voltage with the reference voltage allows discrimination as to whether knocking is occurring.

Diesel engine control is performed by delaying the injection timing by controlling the timer mechanism of, for example, the fuel injection pump of the diesel engine, in accordance with the knocking discrimination result obtained.

In practicing the present invention, various changes and modifications may be made in addition to the embodiment described above. For example, in the embodiment described above, division is performed by an analog circuit. However, as another embodiment, division may be performed digitally as shown in FIG. 5.

Figure 5:
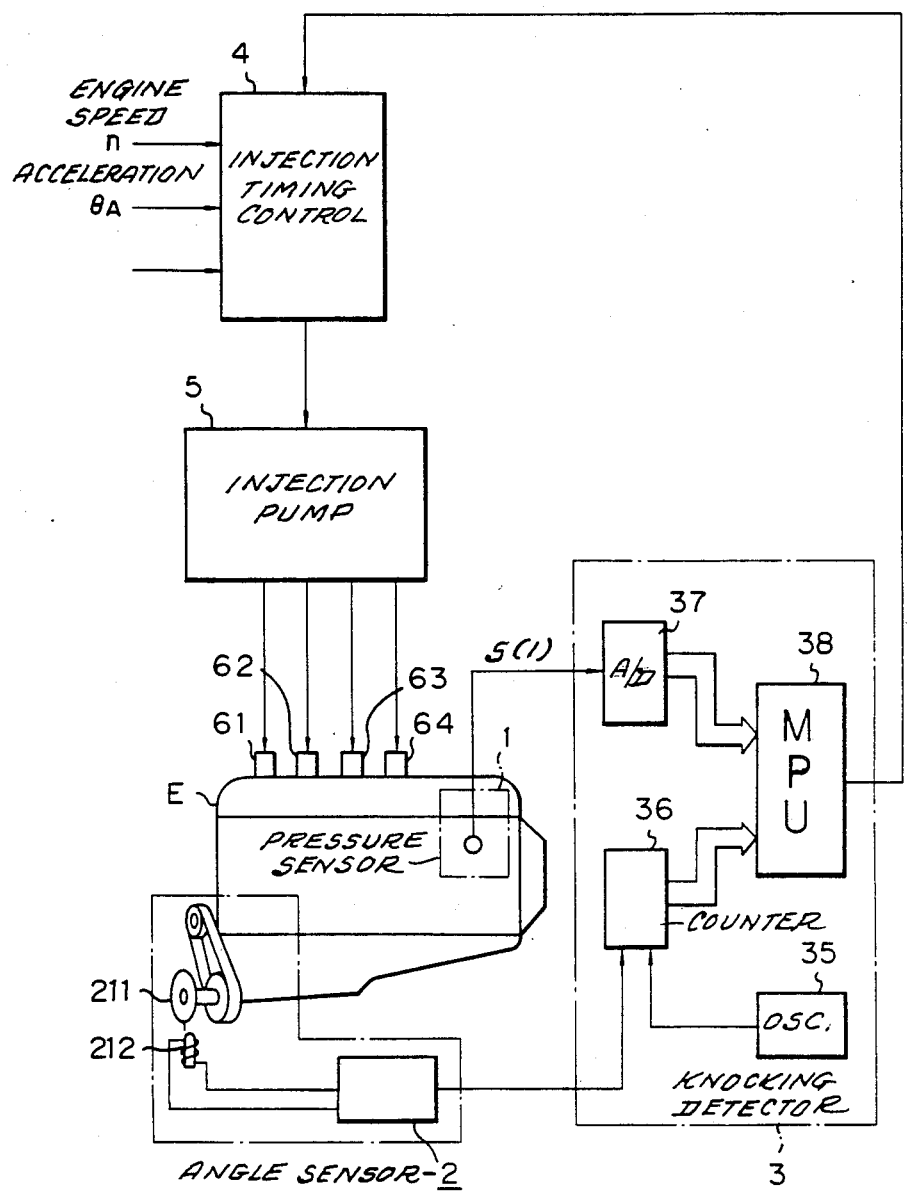
FIG. 5 is a circuit diagram of a device for detection of knocking in a diesel engine according to another embodiment of the present invention.
Figure 6:
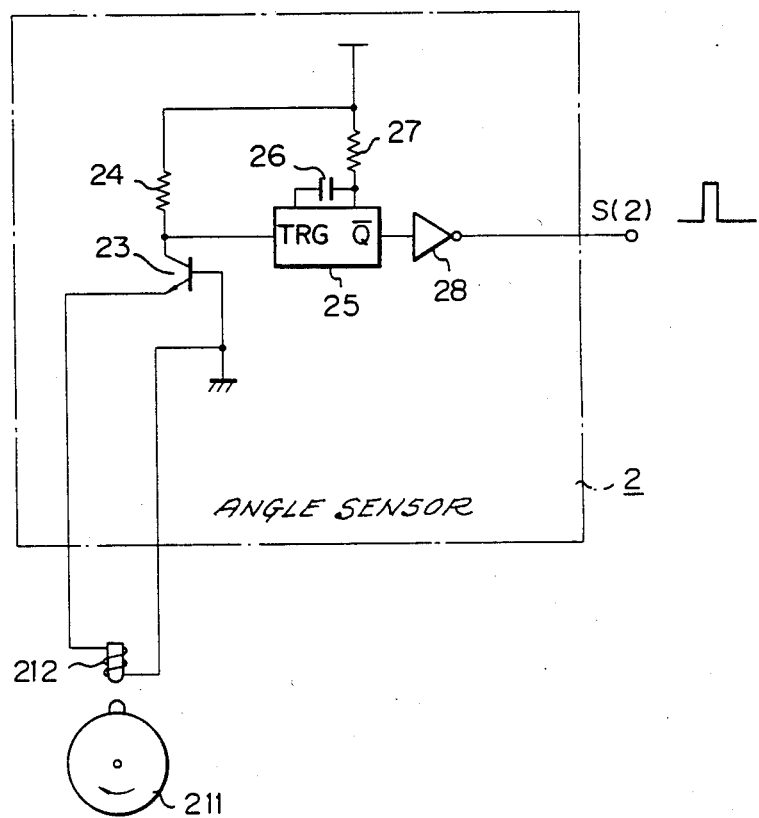
FIG. 6 is a circuit diagram of an angle sensor of the device shown in FIG. 5.

Referring to FIG. 5, reference numeral 2 denotes an angle sensor. A rotor 211 has only one projection, as shown in FIG. 6. Accordingly, an output signal S(2) from the angle sensor 2 is one pulse per revolution or rotation of the crankshaft.

An oscillator 35 oscillates pulses at a predetermined frequency. A counter 36 counts the pulses from the oscillator 35 so as to thereby detect the engine speed.

An analog-to-digital (A/D) converter 37 performs analog-to-digital conversion in accordance with internal clocks. A microprocessor 38 divides the digital value from the A/D converter 37 by the engine speed so as to obtain a rate of change in combustion pressure per unit angle. The microprocessor 38 then compares the obtained rate with the reference rate.

The mode of operation of the device of the second embodiment as described above will now be described below. In response to a leading edge of the output from the angle sensor 2, the counter 36 starts counting the pulses from the oscillator 35. In response to a trailing edge of the output from the angle sensor 2, the counter 36 stops counting. The count of the counter 36 is inversely proportional to the engine speed. Meanwhile, the A/D converter 37 converts a differential output from a pressure sensor 1 into a digital value in accordance with internal clocks. The microprocessor 38 calculates the rate of change in combustion pressure per unit angle by calculating the peak value of the digital signal thus obtained, reading out the inverse of the engine speed of the current cycle from the counter 36, and multiplying the peak value by the count of the counter 36.

Figure 7:
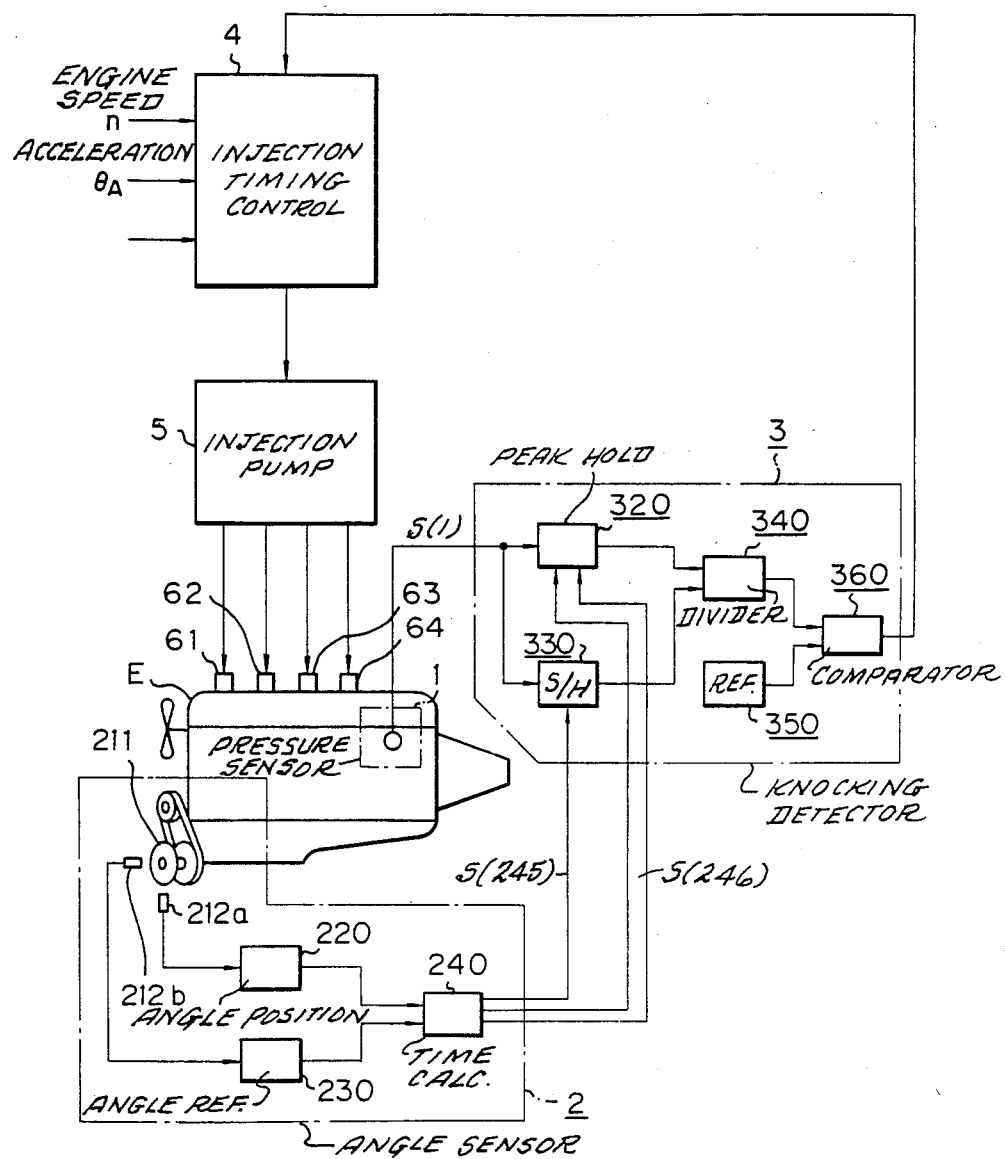
FIG. 7 shows a device for detection of knocking in a diesel engine according to still another embodiment of the present invention.

In FIG. 7 is shown a device for detection of knocking in a diesel engine according to still another embodiment of the present invention.

Referring to FIG. 7, reference symbol E denotes a straight-type 4-cylinder diesel engine. A pressure sensor 1 comprises a piezoelectric element and produces an output signal S(1) which represents a rate of change in combustion pressure per unit time. Reference numerals 2 and 3 denote an angle sensor and a knocking detector, respectively. An injection timing control circuit 4 calculates a reference injection timing based on a rotation rate or engine speed n, an acceleration amount $\theta_A$, and so on. In response to a signal indicating knocking from the knocking detector 3, the injection timing control circuit 4 delays the injection timing for a predetermined delay time. In the absence of such a signal, the injection timing control circuit 4 controls an injection pump 5 such that injection is performed at the reference injection timing. Injection nozzles 61 to 64 inject fuel into the respective cylinders.

The angle sensor 2 consists of a rotor 211 for detection of the engine speed, an angular position detection circuit 220, a reference position detection circuit 230, and a timing calculation circuit 240.

The knocking detector 3 consists of a peak hold circuit 320, a sample/hold circuit 330, a divider 340, a reference voltage generator 350, and a comparator 360.

Figure 8:
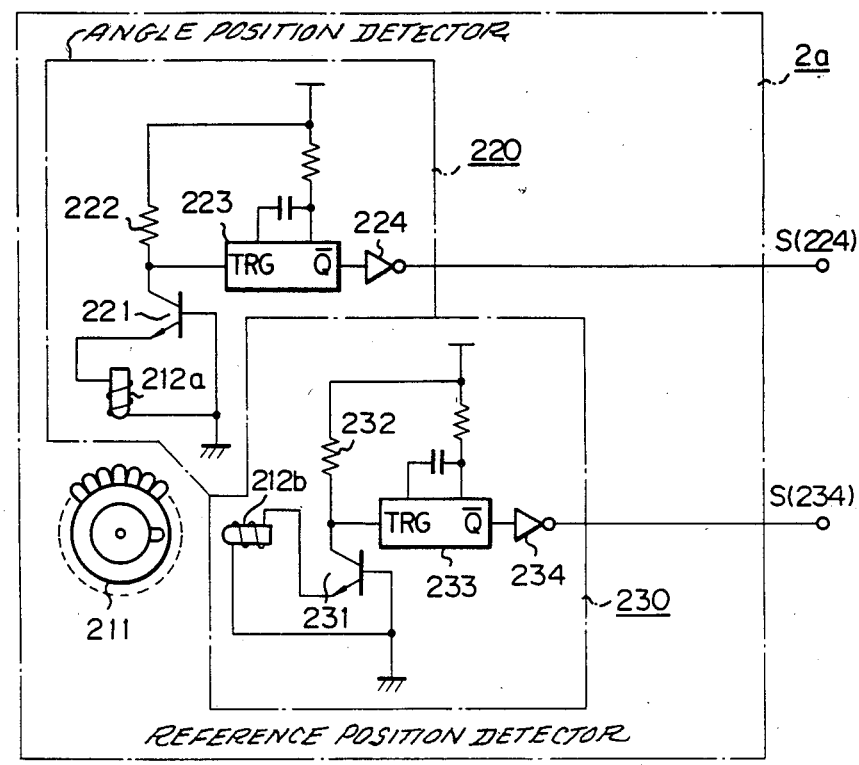
FIGS. 8 and 9 show the configuration of an angle sensor of the device shown in FIG. 7.
Figure 9:
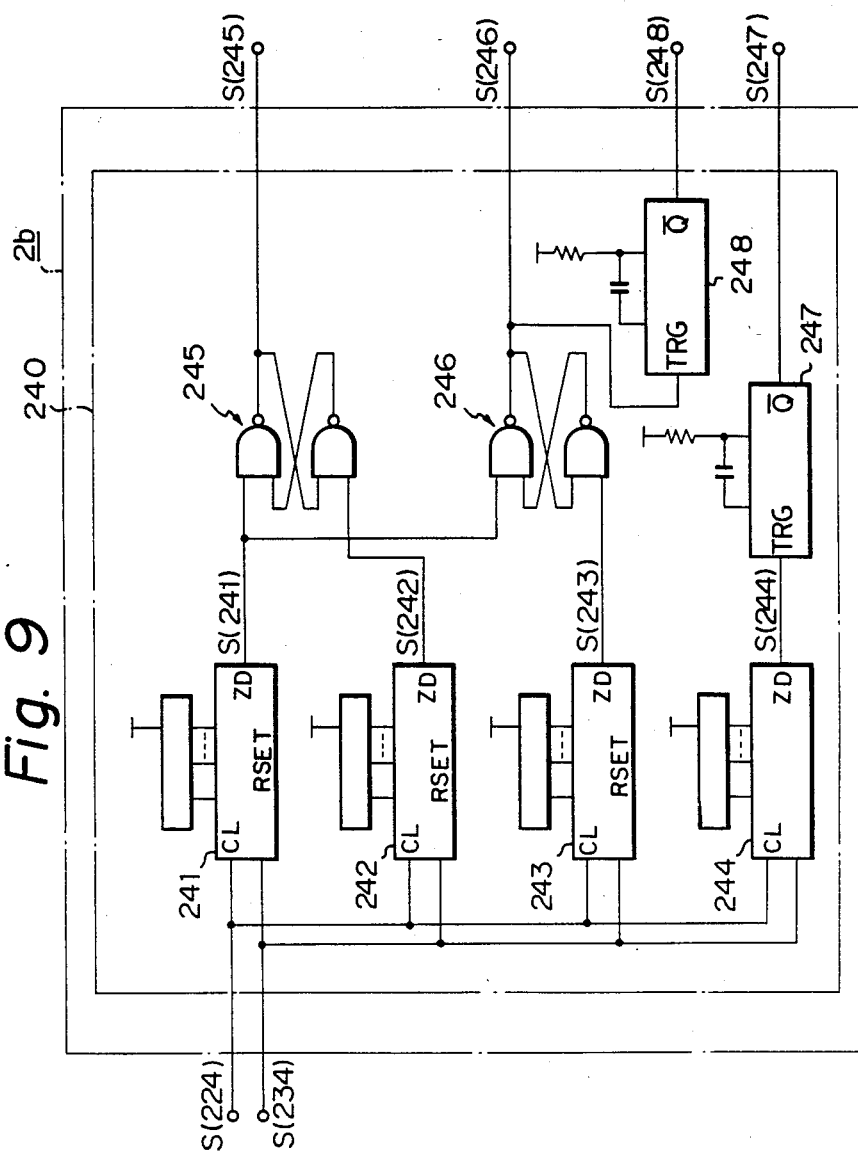

In FIGS. 8 and 9 are shown the configuration of the angle sensor 2, mainly including the angular position detection circuit 220.

The rotor 211 comprises a combination of a first rotor having a plurality of projections on its outer periphery and a second rotor having one projection on its periphery. The rotor 211 is fixed to a distributor shaft (not shown) for rotation therewith.

Electromagnetic pickups 212a and 212b oppose the projections of the respective rotors of the rotor 211.

Reference numerals 221 and 231 denote transistors; 222 and 232, resistors; 223 and 233, one-shot multivibrators; and 224 and 234, drivers.

The collectors of the transistors 221 and 231 are respectively connected to trigger terminals TRG of the one-shot multivibrators 223 and 233.

When the rotor 211 rotates and each projection opposes the electromagnetic pickups 212a and 212b, outputs from these pickups 212a and 212b temporarily drift to negative values. Then, the transistors 221 and 231 are turned on, and the one-shot multivibrators 223 and 233 are triggered by the ON transistors 221 and 231, respectively.

The one-shot multivibrators 223 and 233 produce signals of low level for a time period determined in accordance with the time constant which is, in turn, determined by a resistor and a capacitor. The signals of low level from the one-shot multivibrators 223 and 233 are converted into signals of high level by the inverting drivers 224 and 234, respectively.

An output from the angular position detection circuit 220 produces an output signal S(224) which has a frequency proportional to the engine speed and which has a pulse width which is independent from the engine speed. An output signal from the reference detection circuit 230 is one pulse signal S(234) per rotation.

The timing calculation circuit 240 has down counters 241 to 244, flip-flops 245 and 246, and one-shot multivibrators 247 and 248.

The flip-flop 245 for starting the sample/hold operation and the flip-flop 246 for starting peak hold are set by a signal S(241) from the down counter 241 which is obtained in accordance with the signals S(224) and S(234). The flip-flop 245 is reset to perform the sample/hold operation before the timing of the top dead center (TDC), thereby starting the sample/hold operation.

Similarly, the flip-flop 246 is reset so as to perform peak hold after detection of a peak value in response to the signal S(243). In accordance with the signals S(224) and S(234), the comparator 360 produces an output at a timing of a predetermined crankshaft angle.

Figure 10:
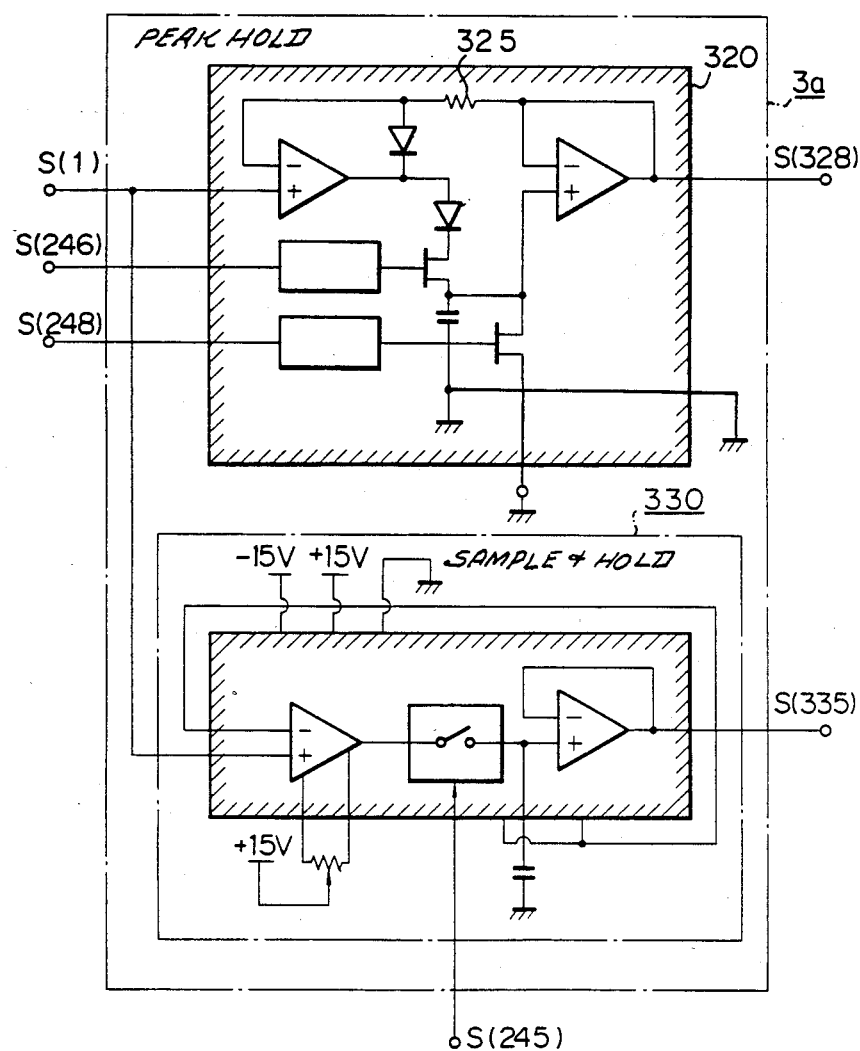
FIGS. 10 and 11 show the configuration of a knocking detector of the device shown in FIG. 7.
Figure 11:
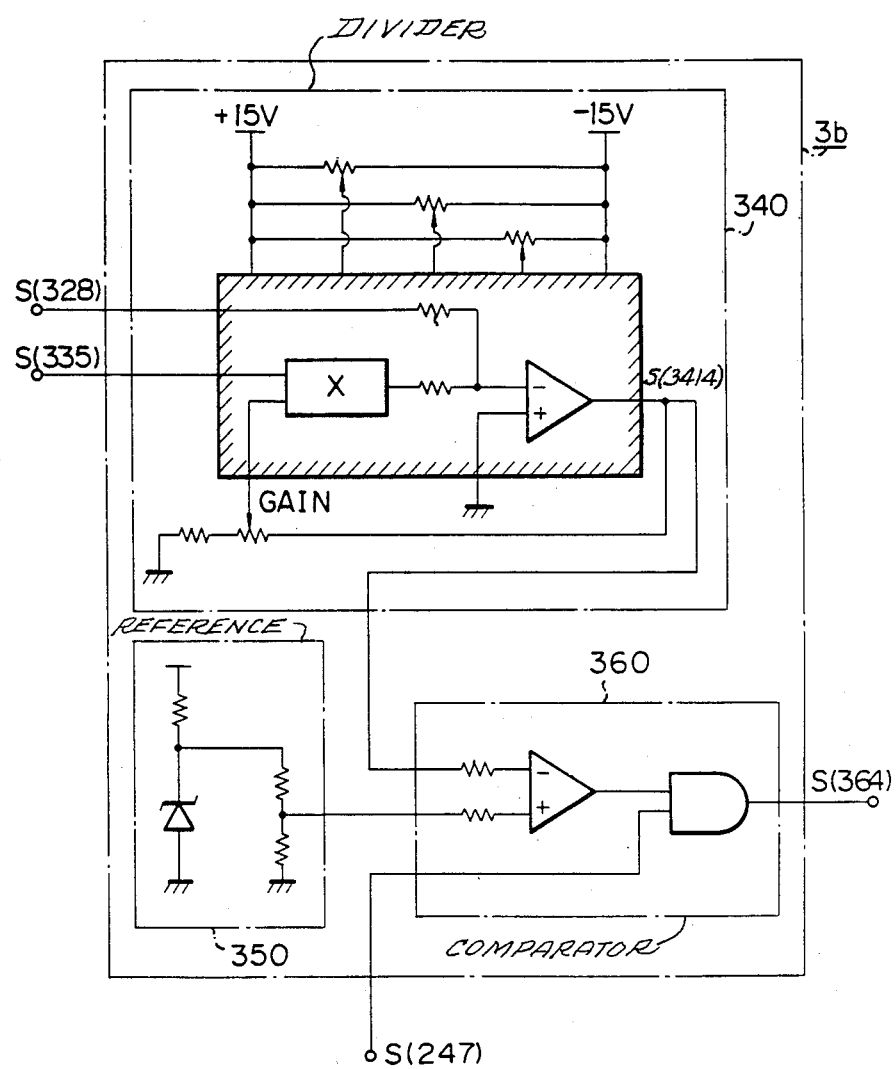

In FIGS. 10 and 11 are shown the configuration of the knocking detector.

The peak hold circuit 320 may comprise a peak hold module 4084/25 available from Burr-Brown Corp. The peak hold circuit 320 holds a peak value obtained when a control input signal S(246) is at high level and resets the held output in response to a control input signal S(248).

The sample/hold circuit 330 may comprise a sample/hold module SHM series available from Detail Intercil Corp. The sample/hold circuit 330 holds the input signal when a control input signal S(245) is at low level.

The divider 340 may comprise, for example, a divider module AD530 series available from Analog Device Corp. The divider 340 produces an output signal S(3414) which is proportional to the ratio of an input signal S(328) to an input signal S(335), i.e., S(328)/S(335).

Reference numeral 350 denotes a reference voltage generator and 360 denotes a comparator which samples in accordance with an input signal S(247).

In the knocking detector 3, the output from the peak hold circuit 320 is divided by the output from the sample/hold circuit 330. The comparator 360 compares an output from the divider 340 with a reference value. When the output from the divider exceeds the reference value, it is determined that knocking has occurred.

This division operation is performed based on the following facts. Irrespective of occurrence of knocking, values dP/dt (for $t=T_h$ where $T_h$ is time at a high engine speed) and dP/dt (for $t=T_l$ where $T_l$ is time at a low engine speed) immediately before the TDC upon ignition are constant provided the engine speed remains constant, and the quotients of the peak values dP/dt (MAX) (for $P=P_h$ where $P_h$ is a pressure at the high engine speed) and dP/dt (MAX) (for $P=P_l$ where $P_l$ is a pressure at the low engine speed) by dP/dt (for $t=T_h$) and dP/dt (for $t=T_l$), respectively, are greater than a predetermined value in the presence of knocking irrespective of the engine speed. Thus, detection of knocking is performed by performing such a division and then correcting the output from the pressure sensor which changes in accordance with the engine speed.

Figure 12:
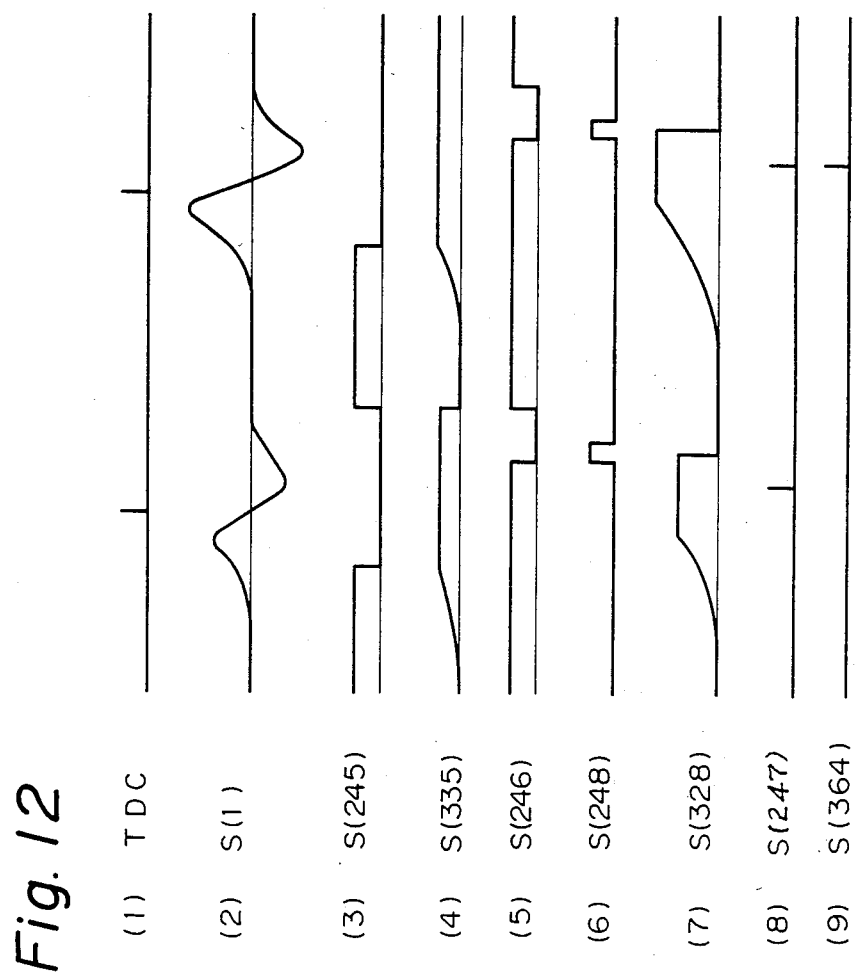
FIG. 12 shows signal waveforms at respective parts of the device shown in FIG. 1.

In FIGS. 12(1) to 12(9) are shown the signal waveforms at the respective parts of the device shown in FIG. 7.

In FIG. 12(1) is shown the TDC timing; FIG. 12(2), an output signal S(1) from the pressure sensor 1; FIG. 12(3), a sample/hold control signal S(245); FIG. 12(4), an output signal S(335) from the sample/hold circuit 330; FIG. 12(5), a peak hold control signal S(246); FIG. 12(6), a peak hold reset signal S(248), FIG. 12(7), an output signal S(328) from the peak hold circuit 320; FIG. 12(8), a sampling timing S(247); and FIG. 12(9), an output signal S(364) from the knocking detector 3, respectively.

We claim:

1. A device for detection of knocking in a diesel engine comprising:

a pressure detection means, having a piezoelectric element, for detecting the rate of change of combustion pressure of the engine;

an angle detection means for detecting the rotation of the engine; and a knocking detection means for receiving the outputs of said pressure detection means and said angle detection means for deciding whether or not knocking occurs;

said knocking detection means comprising a rotation rate detection means for converting the output of said angle detection means to a signal corresponding to the rotation rate of the engine, and a division means for dividing the output of said pressure detection means by the output of said rotation rate detection means, the decision of an occurrence of knocking occuring when the output of said division means exceeds a predetermined value.

2. A device according to claim 1, wherein said rotation rate detection means integrates the pulse outputs of said angle detection means and produces are analog output.

3. A device according to claim 1, wherein said rotation rate detection and said division means comprise a counter means for counting the number of pulses from an oscillator during one rotation of the engine, means for digitally converting the output of said pressure detection means, and a means for digitally multiplying said digitally converted output by the output of said counter means.

4. A device accordingly to claim 1, wherein said division means is an analog circuit.

5. A device according to claim 1, wherein said division means is a digital circuit.

* * * * *

UNITED STATES PATENT AND TRADEMARK OFFICE
CERTIFICATE OF CORRECTION

PATENT NO. : 4,567,751

DATED : February 4, 1986

INVENTOR(S) : OOTSUKA et al

It is certified that error appears in the above-identified patent and that said Letters Patent is hereby corrected as shown below:

Column 8, line 14, "are" should read --an--

Signed and Sealed this

Twelfth Day of August 1986

[SEAL]

Attest:

Attesting Officer

DONALD J. QUIGG

Commissioner of Patents and Trademarks